June 9, 1959  A. THIELEN ET AL  2,889,574
APPARATUS FOR STUFFING SAUSAGE SKINS AND THE LIKE
Filed Dec. 4, 1956

INVENTORS
ANTON THIELEN
ERNST KOCHJOHANN
BY
ATTORNEY

United States Patent Office 2,889,574
Patented June 9, 1959

2,889,574
APPARATUS FOR STUFFING SAUSAGE SKINS AND THE LIKE

Anton Thielen, Bremen, and Ernst Kochjohann, Verden, Germany, assignors to Vemag, Verdener Maschinen- und Apparatebau, Zweigniederlassung der Südostholz G.m.b.H. Metz & Co., Verden (Aller), Germany, a firm Application December 4, 1956, Serial No. 626,185

Claims priority, application Germany May 2, 1956

8 Claims. (Cl. 17—40)

The present invention relates to a method of transferring viscous or other material, especially sausage meat, into receptacles, as for instance sausage skins, and at the same time describes an apparatus to carry out the method in accordance with the present invention.

When producing sausages, different types of filling machines have been used to fill the sausage skin. Some known machines, for example, comprise a piston moving up and down in a corresponding cylinder. According to the capacity of the cylinder, a great volume of sausage meat was put under pressure by the forward moving piston and forced out through a feed nozzle. Portioning devices divided the sausage meat into portions, as required for the individual sausages. Such devices have the disadvantage that the sausage meat is transferred into the sausage skin together with the air which may be contained in the meat. It is another deficiency of these machines that the sausage meat is squashed and ground to a wide extent and that its outer appearance is impaired during the processing operations. In spite of a comparatively high power input, the output of such machines is small. Continuous operation is not possible since the meat container has to be refilled from time to time. In other machines, a hopper is used from which the sausage meat is pressed into the sausage skin through means of rotating impellers or worm conveyors. In these machines the sausage meat is also subjected to high stress. The meat is squashed and ground, and worm conveyors and impellers continuously suck in air from the hopper and press it into the sausage skin. The use of such devices for portioning the sausage meat is limited.

It is one object of the present invention to provide a method of and apparatus for transfer of viscous material which eliminates the deficiencies of the known operating methods and filling machines. The sausage meat is compressed in itself, the air is removed and the meat transferred into the sausage skin under lowest possible mechanical stress and in satisfactory condition.

It is another object of the present invention to provide a method of transfer of viscous material wherein the meat is divided into individual small portions which are compressed and vented and eventually transferred into the sausage skin. This is done in such a manner that the vented portions are continuously fed into a reservoir wherefrom they are discharged after the desired volume of material has accumulated.

It is yet another object of the present invention to provide an apparatus for transfer of viscous material which comprises substantially a pair of worm conveyors to which the material is supplied and which is provided with threads narrowing in the direction of feed. The worm conveyors have a compression zone for the material, i.e. a zone where the thickness of the worm threads increases until at the point of engagement of both worms the thread of one of the worms completely fills out the space between two adjacent threads of the other worm.

Preferably, a zone of invariable pitch is arranged in front of and behind the zone of compression of the worm conveyors. On the other hand, the worms each have a fixed stem or, respectively, a non-rotating center in the zone of compression, i.e. at least from the point at which the threads meshing with each other are closed.

It is still another object of the present invention to provide an apparatus for transfer of viscous material wherein both worm conveyors together form simultaneously an ejecting piston in that they are axially displaceable in a correspondingly shaped cylinder. The axially displaceable pair of worm conveyors is subjected to a force, as for instance the action of a spring, a hydraulic or pneumatic pressure or the like, which tends to force the pair of worm conveyors into the direction of feed. This force is calculated and adjustable so as to correspond to the filling pressure. The arrangement is made so that in front of the cylinders accommodating the axially displaceable worm conveyors a closable mixing and collecting chamber is arranged into which the vented material is supplied when the worm conveyors are rotating. Due to the pressure which builds up when the collecting chamber is filled, both worm conveyors are eventually forced back axially in a direction opposite to that of feed, like a piston, during which movement the front end of the cylinder housing the worm conveyors is also filled up with vented material. The worm conveyors deposit the material in the collecting chamber and in the adjacent part of the cylinder, respectively. According to the size of the portions an adjustable stop is provided which at the right moment interrupts further supply.

It is also a further object of the present invention to provide an apparatus for transfer of viscous material wherein compression of the sausage meat supplied from the worm conveyors is accomplished in that the worm threads narrow in the direction of feed, and that in this zone of compression vent holes are provided in the cylinder enclosing the pair of worm conveyors. The vent holes open into a chamber from which any material possibly taken along during the venting operation can be removed and returned to the material supply.

It is of particular advantage that the material hopper need not be covered, which enables continuous feed of fresh sausage meat. The hopper is provided with a spiral conveyor which ensures that the material is supplied only into the region immediately adjacent the inner wall of the hopper, while the free inner part of the spiral conveyor allows for a back flow of the material. Only in this way it is possible that an amount of sausage meat is supplied to the worm conveyors at an amount capable to be processed thereby.

It is yet a further object of the present invention to provide an apparatus wherein the feeding speed of the device is infinitely variable. The size of the portions is also regulable at will, and the feeding pressure is adjustable. Depending on how the machine has been adjusted, continuous operation is possible which is not interrupted even when fresh sausage meat is filled up, or the material is processed in portions, the size of which being variable.

It is also another object of the present invention to provide a method for transfer of viscous material wherein the process to remove the air may be assisted by providing a suction device or vacuum producer on the part of the cylinder enclosing the compression zone of the worm conveyors, which device subjects the material, during its compression, to the action of a vacuum.

The hopper as well as the worm conveyors and the cylinders enclosing them are provided with chambers in their walls containing cooling fluid or heating means so that the sausage meat can be cooled or heated during operation of the machine or, respectively, during the filling, compressing, and portioning operations.

With these and other objects in view which will become apparent in the following detailed description, the present invention will be clearly understood in connection with the accompanying drawing, in which.

Figure 1:
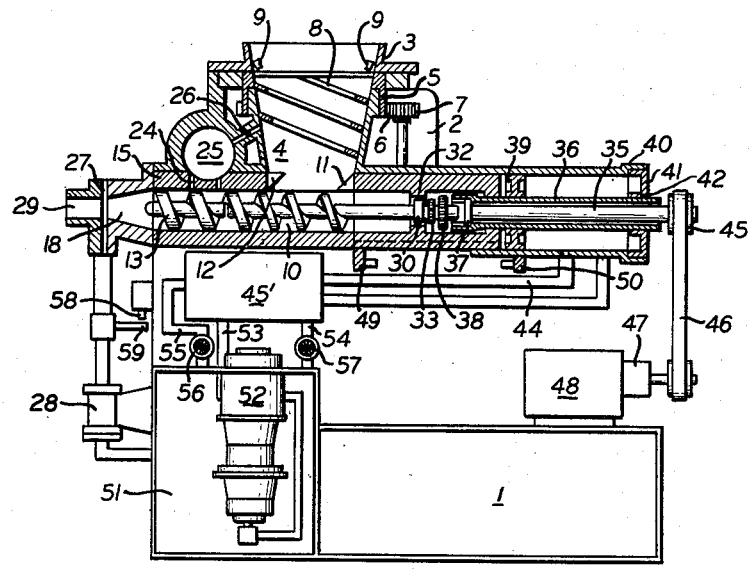
Figure 1 is a longitudinal sectional view through the filling machine.

In the upper part of the machine frame 1, in the housing 2, a hopper 3 is arranged which opens into a container 4. Between the hopper 3 and the container 4, a ring 5 is provided which on its outside forms a gear 6 and which is connected with a spiral conveyor 8 extending into the hopper. As can be clearly seen from the drawing, the spiral conveyor 8 has no center body, i.e. it consists of a single thread only which is effective in the region adjacent the inner wall of the hopper 3 only.

The spiral conveyor 8 is driven by the ring 5 and the gear 6 of the ring 5 through means of a drive gear 7 which is actuated from the power unit of the machine in a suitable manner.

At the upper rim of the stationary container 4 and immediately above the hopper 3 small nozzles 9 are arranged on the periphery which are in communication with a fluid pressure line. It is an object of these nozzles to let small amounts of fluid, as for instance water, fat, or the like, drop on the inner wall of the hopper 3. Thus, the hopper wall is moistened on its surface in contact with the material to be processed. The material can easily slide along the hopper walls. Feed of the material is assisted by the rotating spiral conveyor 8 which is effective in the same region. During rotation of the spiral conveyor 8 the material adhering to the inner wall of the hopper is scraped off and fed to the lower end of the hopper by means of the spiral conveyor 8. Any material in the center part of the conveyor 8 is left to itself, i.e. this material is neither kneaded nor mixed. Due to its weight it falls to the inlet 10 and on the pair of worm conveyors which will be described later. Guide members 11 and 12 ensure that the material enters the worm conveyors in the correct direction. Should the spiral conveyors 8 supply too much material, excess material can return into the center part of the hopper 3. In this way, exact and automatic control of the material volume is accomplished, without the necessity to subject a greater portion of the sausage meat contained in the hopper 3 or in the container 4 to mechanical stress.

The feeding device described and the container 4 for the sausage meat may be used in all kinds of meat-processing machines. The use of this device is not limited to the machine-type hereinafter referred to.

Figure 2:
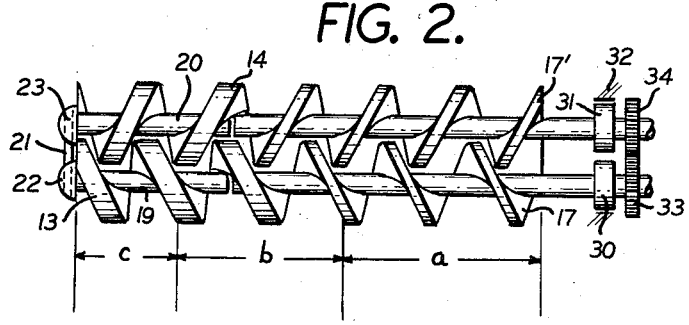
Fig. 2 is a top plan view of the pair of worm conveyors employed.
Figure 3:
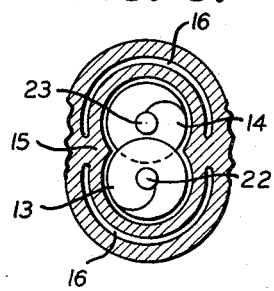
Fig. 3 is a front end view of the pair of worm conveyors.

Below the hopper 3 and the inlet 10 a pair of worm conveyors 13, 14 is operating, as shown in Figs. 2 and 3. This pair of conveyors works in a correspondingly shaped cylinder 15, as can be seen from Fig. 3. In the cylinder walls cooling chambers 16 are formed through which may flow a cooling medium so that when processing sausage meat the material may be cooled, or if necessary, heated.

Both worms are of a particular design. Along their length they are divided in different regions, $a$, $b$, and $c$.

In the region $a$ the sausage meat is supplied from the hopper 3 through the inlet 10. The sausage meat is moved ahead when the worms rotate. For this purpose, the worm threads 17 and 17' are equally wide, and the pitch of both worms is the same. In the region $b$ which follows the region $a$, the worm threads 17 and 17' increase gradually until at the end of the region $b$ the thread 17 and 17', respectively, fits exactly into the space between two successive threads 17' and 17, respectively, of the adjacent worm. This condition is reached where the region $b$ adjoins the region $c$. From now on the material to be supplied cannot escape between the two worms 13 and 14, but is forwarded in the region $c$ in axial direction until it enters the container 18 adjacent the cylinder accommodating the pair of worm conveyors.

To prevent parts of the sausage meat from being ground between the two worm conveyors 13 and 14, the center of both worms, at least in the region $c$, is formed of stationary cores 19 and 20 which at their ends are connected with each other by a pin 21 so that they can follow any axial displacement of the worms 13, 14 in the cylinder and are prevented from rotating with the worms. The cores 19 and 20 have round heads 22 and 23 projecting beyond the front ends of the worms 13, 14.

Due to the particular shape of the worm conveyors, it is accomplished that in the region $a$ the sausage meat is only moved ahead in axial direction, while in the region $b$ the meat is compressed between the worm threads because the space between the threads is reduced. By this arrangement the air possibly contained in the sausage meat is forced out. For this purpose, vent holes 24 are provided in the cylinder 15 in the region $b$, through which holes the air forced out of the sausage meat can escape to a venting chamber 25, where also any sausage meat which might have been forced out is collected.

The venting chamber 25 may be in communication with the hopper 3 through means of a channel 26 so that any sausage meat accumulated in the chamber 25 can be returned through the channel 26 into the feeding device. If necessary, the chamber 25 may be temporarily opened and the accumulated material be removed.

The chamber 18, receiving the material compressed and vented through means of the worm conveyors 13 and 14 is closed by a slide valve 27 which is actuated by a control device 28 to be described later.

On the chamber 18 and behind the valve 27 a discharge opening 29 is arranged to which feeding nozzles, portioning devices or other feeding and control means for the sausage meat may be fitted.

As has been described above, both worm conveyors 13, 14 are slideable and axially displaceable in the cylinder 15. The shafts of both worms 13 and 14 extend to the rear and are in loose engagement with the drive members 30 and 31, journalled in a guide 32 and provided with drive gears 33 and 34. Both worm conveyors are rotated by a main shaft 35, journalled in a guide sleeve 36 and having an internally toothed gear ring 37. A planetary gear 38, provided on the shaft of the drive member 31, transmits the drive to the gears 33, 34 which are in mesh with each other.

Fixedly connected to the sleeve 36 housing the drive shaft 35 is a sealing piston 39 which slides in a cylinder 40 enclosing all of the drive unit. The drive unit and both worm conveyors are axially displaceable in the cylinder 40. On the other hand, the sleeve 36 can be axially displaced in a packing 42 arranged in the cover 41 of the cylinder 40.

The chamber enclosed by the parts 36 and 40 is filled with hydraulic oil. On the other hand, the cylinder 40 is connected with the housing 45' of a control valve, through means of conduits 44.

A drive gear 45 is mounted outside the cylinder 40 on a drive shaft 35 for the worm conveyors. A splined coupling or similar means connects the gear 45 and the shaft 35 so that the drive connection is maintained even during axial displacement.

The drive is further transmitted by V-belts 46 and a gearing 47 to a suitable drive motor 48. By means of the infinitely variable gear unit 47 the rotary speed of the worm conveyors 13, 14 is infinitely variable.

The axially displaceable guide 32 which houses the drive means for the worm conveyors 13, 14 is provided with an axially adjustable stop 49 which extends through a slot in the cylinder 40 to the outside to co-operate with a switch 50. This switch controls the motor 48 so that the machine stops when the abutment 49 contacts the switch 50. By adjusting the stop 49 and the switch 50, respectively, the size of the portions formed of the sausage meat is adjustable at will.

Below the housing 45', receiving the control valve, is provided a reservoir 51 for the hydraulic oil in the machine frame. A pump 52 sucks the hydraulic oil from the reservoir 51 and supplies it to the hydraulic device according to the position of the control valve. The housing 45' of the control valve is in communication with the reservoir 51 and the pump 52, respectively, through means of the feed line 53 and the return lines 54 and 55, respectively, which also have throttles 56 and 57, respectively.

For the control of the machine another switch 58 is provided on a side wall of the machine frame in the region of the slide valve 27. The switch 58 cooperates with an abutment 59 fitted on the rod controlling the valve 27.

The operation of the machine is as follows:

The sausage meat to be processed is filled into the container 4 through the hopper 3 and received by the rotating worm conveyors 13, 14. Between the worm threads of the region b it is compressed and vented and then supplied into the collecting and mixing chamber 18. The valve 27 at this time is closed. Upon further rotation of the worm conveyors 13, 14 the chamber 18 is completely filled up and further sausage meat is stored in the cylinder 15. Due to the pressure building up in the collecting chamber 18, and respectively, at the end of the cylinder 15, the worm conveyors 13, 14 are eventually forced back in the cylinder 15 like a piston. The piston 39 sliding in the cylinder 40 is also pressed back and the hydraulic oil is returned from the cylinder 40 through the pipes 44, 54, 57, to the reservoir 51.

Through means of the throttle 57 the counter pressure of the hydraulic oil can be adjusted at will. The cylinder 15 is filled up until the stop 49 engages the switch 50, which action causes the rotary drive of the worm conveyors 13, 14 to be interrupted and the flow of the hydraulic oil to be reversed, so that when opening the valve 27 by depressing a pedal, both worm conveyors 13, 14, acting like a piston, move forward in the cylinder 15 assisted by the pressure of the hydraulic oil. The sausage meat contained in the cylinder 15 is forced out through the chamber 18 and the feed nozzle 29. The volume and the weight of the sausage meat to be discharged is exactly adjustable. As soon as the pair of worm conveyors has reached its end position, the rotary drive becomes effective again. The valve 27 closes the collecting chamber 18 and a new supply of sausage meat from the hopper 3 comes in, filling the front end of the cylinder 15 with sausage meat.

If the sausage meat is not to be portioned but discharged continuously, the hydraulic oil return in the front end position of the worm conveyors must be prevented by adjusting the control valve in housing 45' accordingly. In this case both worm conveyors then cannot move backwards in axial direction. As soon as the motor 48 is switched on, feed, compression, and venting of the sausage meat starts. The valve 27, of course, must be in open position. By adjusting the infinitely variable gear unit 47 the speed of feed can be regulated at will so that the machine can be adapted to the type of sausage meat to be processed or the strength of the sausage skin to be used.

It is to be understood that in connection with the device described herein a portioning device may be fitted to the discharge nozzle 29, whereby it is possible, during continuous operation, to form individual sausages by twisting.

According to the quality of the sausage meat to be processed, operating and feeding speeds can be varied. Through means of the nozzles 9 any desired amounts of fluid, as for instance water, fat, or the like, may be added. Furthermore, the chambers enclosing the cylinder 15 and the container 4 and hopper 3 may be filled with a cooling or heating medium, or such mediums may be passed through these chambers so that during operation cooling or heating of the sausage meat is possible.

While we have disclosed one embodiment of the present invention, it is to be understood that this embodiment is given by example only and not in a limiting sense, the scope of the present invention being determined by the objects and the claims.

We claim:

1. An apparatus for feeding viscous material in hose-like receptacles, particularly of sausage meat into sausage skins comprising a pair of worm conveyors adapted to receive said material from a hopper and to feed said material into a nozzle, said pair of worm conveyors being mounted for both axial and rotary movement, each of said pair of worm conveyors interengaging the other, and the thickness of the threads of each of said worm conveyors increasing in the direction of feeding of said material, in order to reduce the feeding volume and to increase the density of said material, said worm conveyors having an increase of their threads in their median portion only, to define a first region having equal threads of smaller thickness, a second median region having threads of increasing thickness, and a third region having equal threads of greater thickness, and said worm conveyors forming engagement points relative to each other and the thread of one of said worm conveyors filling out completely at said engagement points the space between two adjacent threads of the other of said conveyor worms, and said threads in said third region having equal threads of greater thickness having an immovable axial core member.

2. The apparatus, as set forth in claim 1, wherein both said worm conveyors are mounted for axial movement thereof and jointly form a discharge piston.

3. The apparatus, as set forth in claim 2, which includes means operating continuously the rotary movement of said worm conveyors.

4. The apparatus, as set forth in claim 2, which includes means for operating intermittently the axial movement of said worm conveyors.

5. The apparatus, as set forth in claim 2, which includes means associated with said worm conveyors urging said material in the direction of feeding.

6. The apparatus, as set forth in claim 5, wherein said means associated with said worm conveyors urging said material in the direction of feeding are of such measure that they correspond to the feeding pressure of said material.

7. The apparatus, as set forth in claim 6, which includes a mixing chamber disposed in front of said worm conveyors, means causing the closing of said mixing chamber, said mixing chamber being adapted to receive said material during turning of said worm conveyors and to push backwardly said worm conveyors in a direction contrary to that of the feeding of the material due to the pressure accumulated in said mixing chamber, and a cylinder surrounding said worm conveyors, said cylinder being filled with said material, from which air has been removed due to the pressure in said mixing chamber, and abutment means causing stopping the feeding of said material at predetermined points of said feeding.

8. The apparatus as set forth in claim 7, which includes means preventing the axial movement of said worm conveyors, in order to permit continuous discharge of said dense material from which air has been removed upon opening said mixing chamber.

References Cited in the file of this patent

UNITED STATES PATENTS

| | | |
|---|---|---|
| 1,130,661 | Bazley | Mar. 2, 1915 |
| 1,847,690 | Hottmann | Mar. 1, 1932 |
| 2,119,162 | Hartner | May 31, 1938 |
| 2,380,346 | Marshall | July 10, 1945 |
| 2,481,689 | Schaub | Sept. 13, 1949 |
| 2,693,348 | Ellermann | Nov. 2, 1954 |
| 2,693,835 | Lundell | Nov. 9, 1954 |

FOREIGN PATENTS

| | | |
|---|---|---|
| 315,571 | Switzerland | Oct. 14, 1956 |